(12) United States Patent
Zayhowski

(10) Patent No.: US 6,512,630 B1
(45) Date of Patent: Jan. 28, 2003

(54) MINIATURE LASER/AMPLIFIER SYSTEM

(75) Inventor: John J. Zayhowski, Pepperell, MA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/907,893

(22) Filed: Jul. 13, 2001

(51) Int. Cl.⁷ .................. H01S 3/00; H01S 3/09; H01S 3/092; H01S 3/093
(52) U.S. Cl. .................. 359/345; 359/333; 359/342; 359/343; 372/69; 372/71; 372/72
(58) Field of Search .................. 359/342, 343, 359/345, 341.3; 372/69, 71, 72, 40; 501/37

(56) References Cited

U.S. PATENT DOCUMENTS

| | | | | |
|---|---|---|---|---|
| 4,220,928 A | * | 9/1980 | Bloom et al. | 359/27 |
| 4,321,551 A | * | 3/1982 | Bleil et al. | 359/343 |
| 4,637,025 A | * | 1/1987 | Snitzer et al. | 372/1 |
| 5,070,507 A | * | 12/1991 | Anthon | 372/41 |
| 5,084,051 A | * | 1/1992 | Tormala et al. | 428/688 |
| 5,200,972 A | * | 4/1993 | Scheps | 372/41 |
| 5,256,164 A | * | 10/1993 | Mooradian | 372/21 |
| 5,327,444 A | * | 7/1994 | Mooradian | 372/40 |
| 5,381,431 A | * | 1/1995 | Zayhowski | 372/10 |
| 5,386,427 A | * | 1/1995 | Zayhowski | 372/101 |
| 5,394,413 A | * | 2/1995 | Zayhowski | 372/10 |
| 5,402,437 A | * | 3/1995 | Mooradian | 372/22 |
| 5,708,672 A | * | 1/1998 | Pessot et al. | 372/23 |
| 5,732,100 A | * | 3/1998 | Thony et al. | 372/108 |
| 5,859,867 A | * | 1/1999 | An et al. | 372/108 |
| 6,144,484 A | * | 11/2000 | Marshall | 359/333 |
| 6,173,001 B1 | * | 1/2001 | Zayhowski | 372/108 |
| 6,212,216 B1 | * | 4/2001 | Pillai | 372/108 |
| 6,373,864 B1 | * | 4/2002 | Georges et al. | 372/10 |
| 6,376,399 B1 | * | 4/2002 | Aitken et al. | 359/343 |
| 6,400,495 B1 | * | 6/2002 | Zayhowski | 359/330 |
| 6,417,955 B1 | * | 7/2002 | Kafka et al. | 359/333 |
| 6,421,573 B1 | * | 7/2002 | Kafka et al. | 700/121 |

OTHER PUBLICATIONS

Svelto, C. "Characterization of diode–pumped single–frequency Er–Yb bulk microlasers at 1.55 um." Electrical and Electronic Engineers in Israel. Apr. 2000, pp. 75–78.*

Bourdet, Gilbert L. "Gain and Absorption saturation in end pumped Tm:YVO4 and Tm:Ho:YLF CW amplifiers." Optics Communications V. 173, Jan. 2000, pp. 333–340.*

* cited by examiner

Primary Examiner—Thomas H. Tarcza
Assistant Examiner—Andrew R. Sommer
(74) Attorney, Agent, or Firm—William G. Auton

(57) ABSTRACT

Many longitudinally pumped miniature lasers (single-frequency Nd:YAG microchip lasers and Q-switched microchip lasers) are sufficiently short that only a small fraction of the incident pump light is absorbed as it passes through the gain medium. The efficiency of such a laser is improved when the output face of the laser is coated to reflect the pump light, thereby allowing double-pass absorption of the light within the gain medium. The total absorption may still be small, however. Additionally, the divergence of typical pump sources (diode lasers or optical fibers) is large enough that there is often poor overlap between the reflected pump light and the oscillating mode, and the efficiency of the device is not significantly enhanced. If the output face of the miniature laser is coated to be highly transmitting to the pump radiation, the transmitted pump light can be collected with a lens and focused in to an amplifying medium ($Nd:YVO_4$). The focusing optics will also focus the output of the laser, which may be concentric with the pump radiation, and good overlap between the collected pump light and the laser output can be obtained within the amplifier. If the amplifying medium is highly absorbing to the pump light and has high gain at the lasing wavelength, significant amplification can be obtained. The result is a simple, efficient, miniature laser/amplifier system pumped by a single pump source.

LASER/AMPLIFIER SYSTEM

6 Claims, 2 Drawing Sheets

MINIATURE LASER/AMPLIFIER SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers and particularly to a laser-diode-pumped solid-state laser and amplifier for producing laser emission at one or more laser wavelengths.

Lasers are devices that generate or amplify light. The beams of radiation that lasers emit or amplify have remarkable properties of directionality, spectral purity and intensity. These properties have already led to an enormous variety of applications. The essential elements of the laser device are (1) a laser medium consisting of an appropriate collection of atoms, molecules, ions or, in some instances, a semiconducting crystal; (2) a pumping process to excite these atoms, molecules, etc., into higher quantum-mechanical energy levels; and (3) suitable optical elements that allow a beam of radiation to either pass once through the laser medium that is in a laser amplifier, or bounce back and forth repeatedly through the laser medium, as in a laser oscillator. The laser oscillator contains an optical cavity or resonator which is defined by highly reflecting surfaces which form a closed round-trip path for light. The laser medium is contained within the optical cavity.

The elements of a laser come in a great variety of forms and fashions. One type of laser medium that has numerous advantages compared to others is the solid-state laser medium consisting of a laser crystal with one or more dopant ions that is, generally, optically pumped. The optical pump may be an incoherent source, such as cw lamps, including tungsten filament lamps or arc lamps, or pulsed lamps, such as flashlamps, or a monochromatic laser source. Monochromatic laser pump sources include ion lasers or dye lasers or semiconductor laser diodes, such as, an aluminum gallium arsenide (AlGaAs) laser diode operating at approximately 808.5 nm pumping a Nd:YAG solid-state laser material. As an example of this type of laser, see the article "Efficient Laser Diode Pumped Nd Lasers" by Richard Scheps in Applied Optics, vol. 28, pp. 89–91 (January 1989). Excellent examples of solid-state longitudinally pumped lasers are disclosed in the following U.S. Patents, the disclosures of which are incorporated herein:

U.S. Pat. No. 5,048,051, Sep. 10, 1991, Optically-stabilized piano-plano optical resonators, Zayhowski, John J;

U.S. Pat. No. 5,402,437, Mar. 28, 1995, Microchip laser, Mooradian;

U.S. Pat. No. 5,327,444, Jul. 5, 1994, Solid state waveguide lasers, Mooradian;

U.S. Pat. No. 5,200,972, Apr. 6, 1993, ND laser with co-doped ion(s) pumped by visible laser diodes, Scheps;

U.S. Pat. No. 6,173,001, Jan. 9, 2001, Output couplers for lasers, Zayhowski, John J.;

U.S. Pat. No. 5,256,164, Oct. 26, 1993, Method of fabricating a microchip laser, Mooradian;

U.S. Pat. No. 5,386,427, Jan. 31, 1995, Thermally controlled lenses for lasers, Zayhowski.

The above-cited patents show that laser-diode pumping of Nd:YAG lasers is well recognized. The laser-diode output radiation must substantially match the absorption wavelength of the Nd:YAG laser medium which, in general, corresponds to a wavelength of 808.5 nm. This matching of the laser-diode emission wavelength with the absorption wavelength and bandwidth of the Nd:YAG laser material at 808.5 nm is required for relatively efficient operations, both in terms of pumping efficiency, by which is meant the efficiency by which pump photons populate the upper laser level, and in terms of overall electrical power consumption by the pump diodes themselves to generate a specific amount of optical laser power from the Nd:YAG laser material. The absorption bandwidth of Nd:YAG is approximately 1 nm. It is both difficult and expensive to fabricate laser diodes or laser diode arrays with the proper power, bandwidth and center wavelength required for efficient pumping of Nd:YAG laser media.

Many longitudinally pumped miniature lasers (single-frequency Nd:YAG microchip lasers and Q-switched microchip lasers) are sufficiently short that only a small fraction of the incident pump light is absorbed as it passes through the gain medium. The efficiency of such a laser is improved when the output face of the laser is coated to reflect the pump light, thereby allowing double-pass absorption of the light within the gain medium.

SUMMARY OF THE INVENTION

The present invention is a miniature laser/amplifier system composed of an optical pump, a miniature laser, a lens and an amplifying medium. In one embodiment, the miniature laser is a typical longitudinally pumped miniature laser (single-frequency Nd:YAG microchip laser or Q-switched microchip laser), as described in the above-cited patents. As mentioned above, the efficiency of such a laser is improved when the output face of the laser is coated to reflect the pump light, thereby allowing double-pass absorption of the light within the gain medium. The total absorption may still be small, however. Additionally, the divergence of typical pump sources (diode lasers or optical fibers) is large enough that there is often poor overlap between the reflected pump light and the oscillating mode, and the efficiency of the device is not significantly enhanced.

If the output face of the miniature laser is coated to be highly transmitting to the pump radiation, the transmitted pump light can be collected with a lens and focused in to an amplifying medium (Nd:YVO$_4$). The focusing optics will also focus the output of the laser, which may be concentric with the pump radiation, and good overlap between the collected pump light and the laser output can be obtained within the amplifier. If the amplifying medium is highly absorbing to the pump light and has high gain at the lasing wavelength, significant amplification can be obtained. The result is a simple, efficient, miniature laser/amplifier system pumped by a single pump source.

It is an object of the present invention to provide a miniature laser/amplifier that is pumped by a single source to output a beam with high-gain amplification.

These and many other objects and advantages of the present invention will be readily apparent to one skilled in the pertinent art from the following detailed description of a preferred embodiment of the invention and related drawings.

DESCRIPTION OF THE PREFERRED EMBODIMENT

Figure 1:
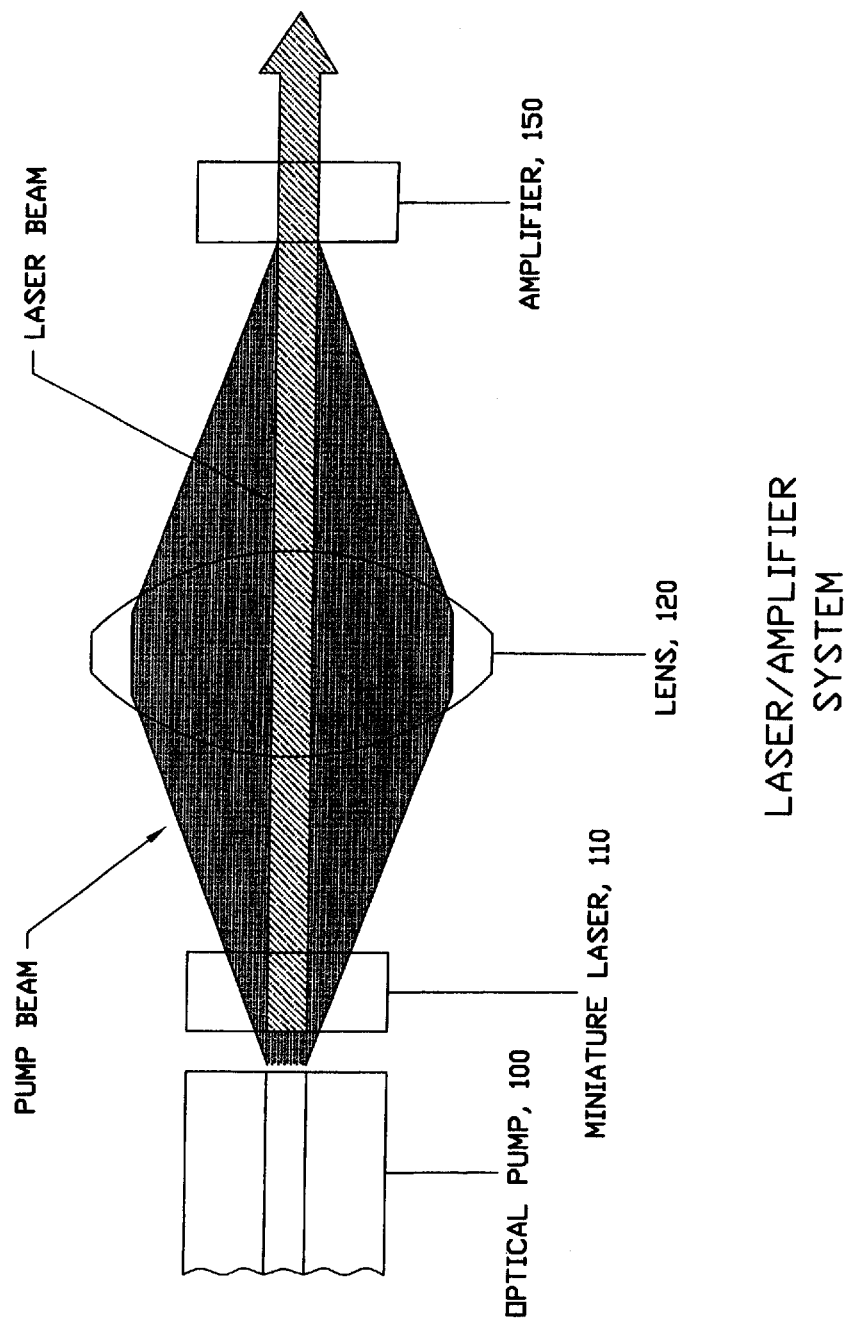
FIG. 1 is a view of the preferred embodiment of the present invention.

The present invention is a miniature laser/amplifier system. As shown in FIG. 1, it is composed of an optical pump

100, a miniature laser 110, a lens 120 and an amplifying medium 150. In one embodiment, the miniature laser is a typical longitudinally pumped miniature laser (single-frequency Nd:YAG microchip laser or Q-switched microchip laser, as described in the above-cited patents.)

As mentioned above, the efficiency of such a laser can be improved when the output face of the laser is coated to reflect the pump light, thereby allowing double-pass absorption of the light within the gain medium. In the system of FIG. 1, total absorption may still be small, however. Additionally, the divergence of typical pump sources (diode lasers or optical fibers) is large enough that there is often poor overlap between the reflected pump light and the oscillating mode, and the efficiency of the device is not significantly enhanced.

The output face of the miniature laser is coated to be highly transmitting to the pump radiation, and the transmitted pump light is collected with a lens and focused in to an amplifying medium (Nd:YVO$_4$). The focusing optics will also focus the output of the laser, which may be concentric with the pump radiation, and good overlap between the collected pump light and the laser output can be obtained within the amplifier. If the amplifying medium is highly absorbing to the pump light and has high gain at the lasing wavelength, significant amplification can be obtained. The result is a simple, efficient, miniature laser/amplifier system pumped by a single pump source, as illustrated in the attached figure.

In some cases, the divergence of the pump may be small enough, or the length of the miniature laser short enough, that the amplifier can be put in close proximity to the laser without intervening optics. In other cases, it may be desirable to include additional optics so that the output of the laser can be passed through the amplifier several times. In either case, the result is still a simple, efficient, miniature laser/amplifier system pumped by a single pump source 100.

Figure 2:
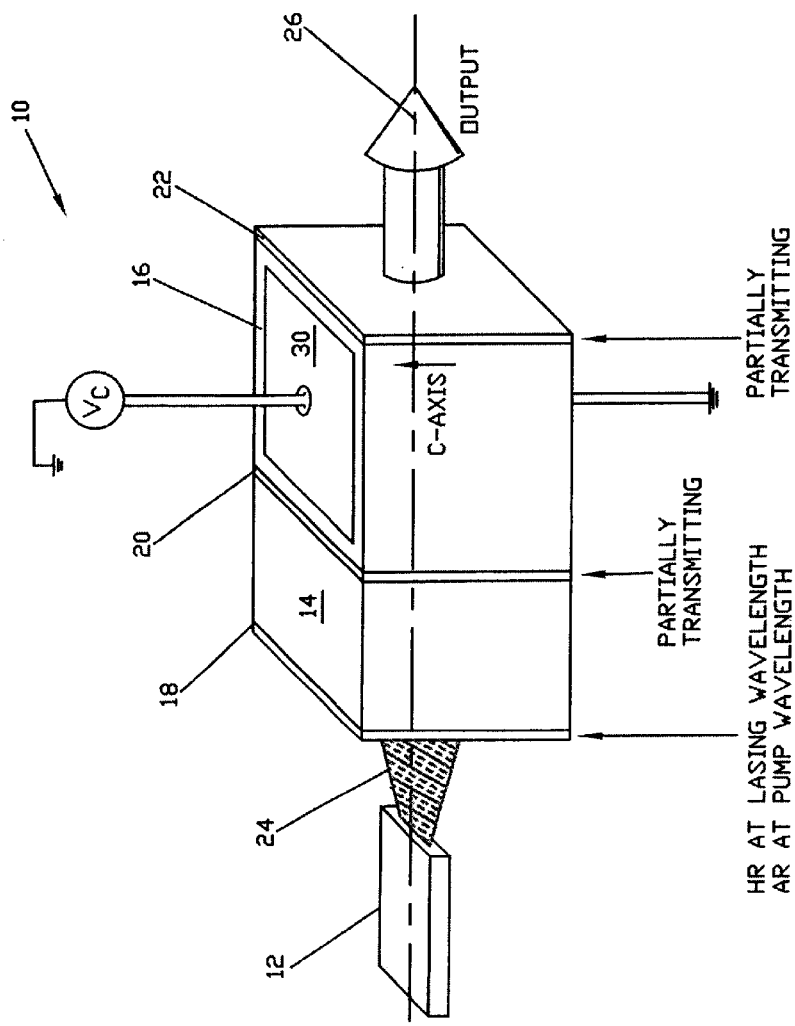
FIG. 2 is a prior-art microlaser system from a Zayhowski patent with elements useable in the present invention.

FIG. 2 is a prior-art optically pumped laser that uses elements that can be applied to the present invention. In FIG. 2, the microlaser 10 consists of a short piece of gain medium 14, for example Nd:YAG, bonded to an electrooptic crystal 16, for example LiTaO$_3$. Both materials are polished flat and parallel on the two faces normal to the optic axis 26. The pump-side face of the gain medium 14 is coated dielectrically to form a mirror 18, which transmits the pump light 24 and is highly reflective at the oscillating frequency v$_l$ of the microlaser 10. The facets at the interface between the two materials and the output face of the electrooptic crystal are coated to form partially reflecting mirrors 20 and 22, respectively, with reflectivities R$_1$ and R$_2$, respectively, at the lasing frequency. Electrodes are deposited on the appropriate two faces of the electrooptic crystal 16 so that its refractive index can be modulated by a control voltage V$_c$.

The microlaser of FIG. 2 is pumped by a light source 12, which can be a diode laser. In both FIGS. 1 and 2, equivalent gain media may comprise any of the following: non-stoichiometric materials, such as Nd:YVO$_4$, Nd:YLF, Tm:YVO$_4$, Tm:Ho:YLF or Tm:Ho:YAG; or stoichiometric materials, such as LNP (lithium neodymium tetraphosphate) or NPP (neodymium pentaphosphate). The tuneable second resonator cavity may comprise acoustooptic, magnetoptic, or nonlinear optic cavities. Equivalent electrooptic materials may comprise LiNbO$_3$, KNbO$_3$ or Ba$_2$NaNb$_5$O$_{15}$. Equivalent pump sources may comprise lamps or other laser devices.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A microlaser/amplifier system comprising:

an optical pump source which emits an optical pumping beam;

a miniature laser which is stimulated to emit a laser output by the optical pumping beam;

a lens that focuses the laser output of the miniature laser along with any of the optical pumping beam that is transmitted by the miniature laser; and an optical amplifier which is composed of a selected amplifying medium, and which receives the output of the miniature laser and the optical pumping beam that is transmitted by the miniature laser such that the optical amplifier amplifies the laser output, without the use of a separate pumping beam source for pumping the optical amplifier.

2. A microlaser/amplifier, as defined in claim 1, wherein said amplifying medium comprises Nd:YVO$_4$.

3. A microlaser/amplifier system, as defined in claim 1, wherein said amplifying medium is selected from the group consisting of: Nd:YVO$_4$, Nd:YLF, Tm:YVO$_4$, Tm:Ho:YLF, Tm:Ho:YAG, LNP and NPP.

4. A microlaser/amplifier system, as defined in claim 1, wherein said optical pump source comprises a diode laser, and wherein said miniature laser comprises a single-frequency Nd:YAG microchip laser.

5. A microlaser/amplifier system, as defined in claim 2, wherein said optical pump source comprises a diode laser, and wherein said miniature laser comprises a single-frequency Nd:YAG microchip laser.

6. A microlaser/amplifier system, as defined in claim 3, wherein said optical pump source comprises a diode laser, and wherein said miniature laser comprises a single-frequency microchip laser.

* * * * *